United States Patent
Vikram et al.

(10) Patent No.: US 11,917,564 B2
(45) Date of Patent: Feb. 27, 2024

(54) ENHANCED INTER-FREQUENCY DETECTION FOR MISALIGNED BASE STATIONS

(71) Applicant: QUALCOMM Incorporated, San Diego, CA (US)

(72) Inventors: Sushant Vikram, San Diego, CA (US); Arvind Vardarajan Santhanam, San Diego, CA (US); Jyotica Yadav, San Diego, CA (US); Xiaoning Lu, San Diego, CA (US); Kushang Desai, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 274 days.

(21) Appl. No.: 17/456,800

(22) Filed: Nov. 29, 2021

(65) Prior Publication Data
US 2023/0171713 A1    Jun. 1, 2023

(51) Int. Cl.
*H04W 24/10* (2009.01)
*H04W 56/00* (2009.01)
*H04W 24/02* (2009.01)

(52) U.S. Cl.
CPC ......... *H04W 56/001* (2013.01); *H04W 24/02* (2013.01); *H04W 24/10* (2013.01)

(58) Field of Classification Search
CPC ... H04W 56/001; H04W 24/02; H04W 24/10; H04W 56/00; H04W 56/0015
See application file for complete search history.

(56) References Cited

U.S. PATENT DOCUMENTS

2022/0225132 A1* 7/2022 Roy ................... H04B 7/18519

FOREIGN PATENT DOCUMENTS

WO    WO-2022078718 A1 *  4/2022

* cited by examiner

*Primary Examiner* — Chuong A Ngo
(74) *Attorney, Agent, or Firm* — Arent Fox LLP / Qualcomm Incorporated

(57) ABSTRACT

Apparatus, methods, and computer-readable media for enhanced inter-frequency detection between misaligned base stations are disclosed herein. A user equipment (UE) may determine that a neighbor cell associated with a first frequency is misaligned with a serving cell associated with a second frequency different than the first frequency based on first measurements of the neighbor cell within a first measurement gap window having a first length. The UE may detect a location of a synchronization signal block (SSB) associated with the neighbor cell within a second measurement gap window having a second length greater than the first length. The UE may determine an alignment offset between the location of the SSB and the first measurement gap window. The UE may obtain second measurements of the neighbor cell within a third measurement gap window that includes the location of the SSB based on the alignment offset and parameters of the SSB.

30 Claims, 8 Drawing Sheets

700

702
DETERMINE THAT A NEIGHBOR CELL ASSOCIATED WITH A FIRST FREQUENCY IS MISALIGNED WITH A SERVING CELL ASSOCIATED WITH A SECOND FREQUENCY DIFFERENT THAN THE FIRST FREQUENCY BASED ON FIRST MEASUREMENTS OF THE NEIGHBOR CELL WITHIN A FIRST MEASUREMENT GAP WINDOW HAVING A FIRST LENGTH

704
DETECT A LOCATION OF AT LEAST ONE SYNCHRONIZATION SIGNAL BLOCK (SSB) ASSOCIATED WITH THE NEIGHBOR CELL WITHIN A SECOND MEASUREMENT GAP WINDOW HAVING A SECOND LENGTH GREATER THAN THE FIRST LENGTH BASED ON THE DETERMINING THAT THE NEIGHBOR CELL IS MISALIGNED WITH THE SERVING CELL

706
DETERMINE AN ALIGNMENT OFFSET BETWEEN THE LOCATION OF THE AT LEAST ONE SSB ASSOCIATED WITH THE SECOND CELL AND THE FIRST MEASUREMENT GAP WINDOW

708
OBTAIN SECOND MEASUREMENTS OF THE NEIGHBOR CELL WITHIN A THIRD MEASUREMENT GAP WINDOW THAT INCLUDES THE LOCATION OF THE AT LEAST ONE SSB ASSOCIATED WITH THE NEIGHBOR CELL BASED ON THE ALIGNMENT OFFSET AND ONE OR MORE PARAMETERS OF THE AT LEAST ONE SSB ASSOCIATED WITH THE NEIGHBOR CELL

ENHANCED INTER-FREQUENCY DETECTION FOR MISALIGNED BASE STATIONS

BACKGROUND

Technical Field

The present disclosure generally relates to communication systems, and more particularly, to enhanced inter-frequency detection for misaligned base stations.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to various radio access networks (RANs), such as 5G New Radio (NR) RANs, communication by base stations and user equipment (UE) may occur at least partially within a millimeter wave (mmW) (e.g., potentially including near-mmW) spectrum. For example, 5G NR RANs may include frequency range 2 (FR2) that includes frequency bands from approximately 24.25 gigahertz (GHz) to 52.6 GHz. Such mmW deployment may include some small cells having a relatively smaller coverage area than other cells (e.g., macro cells) in lower bands (e.g., sub-6 GHz bands) and/or legacy RANs (e.g., Long Term Evolution (LTE)).

Communication in mmW spectrums, including FR2 for 5G NR, may be relatively less robust than communication in lower bands (e.g., sub-6 GHz bands). For example, mmW communication (e.g., beam paths) may be adversely affected by the environment, including blockers, reflective surfaces, etc., which may a line-of-sight (LoS) path between a base station and a UE. In response to the relatively unpredictable and unreliable characteristics commensurate with communication in mmW access networks, mmW deployments may include a large number of base stations. In particular, mmW deployments may include many small cells and/or secondary cells (SCells) within one geographic coverage area, such he coverage area of a macro base station (e.g., gNB). The large number of base stations may increase the frequency with which a UE is handed over between base stations.

Base stations may make handover decisions for UEs based on measurement reporting by the UEs. The measurement reports may indicate the respective qualities of channels between the UE and a set of base stations, such as the source base station with which the UE is connected and one or more target base stations to which the UE may connect. However, in a multi-cell scenario, where two or more cells (e.g., a serving cell and a neighbor cell) are misaligned with respect to system frame number (SFN) and/or time, neighbor cell detection can fail, resulting in the UE remaining connected to a low-coverage and/or a low-throughput cell. This may be due to differing SSB periodicities between 5G NR cells. In view of the foregoing, a need exists for approaches to address inter-frequency detection when multi-cell misalignment exists.

Thus, techniques and solutions of the present disclosure provide for improved inter-frequency detection between base stations. In case of misalignment between base stations, the UE can generate a SSB measurement timing configuration (SMTC) periodicity based measurement gap (e.g., OTA gap plus one or more subframes) that is combined with or separate from an originally configured measurement gap. Once the UE determines the SSB location, the UE can further enhance measurement gap duration and help with reducing data outage occurrences and increasing throughput and/or reliability during idle mode mobility scenarios.

The subject technology provides several advantages over legacy approaches in inter-frequency detection, including but not limited to, the UE can switch to a high-bandwidth cell to receive improved communication throughput and provide a more enhanced user experience. The enhanced inter-frequency detection can provide for improved idle mode mobility scenarios by increasing the rate of detecting neighbor cell SSBs at the UE, thus increasing throughput and/or reliability during idle mode mobility scenarios. With SMTC-based measurement gap optimization, the UE can achieve power savings by focusing the measurement gap in locations where the neighbor cell SSBs are more likely to be present and thereby reducing (or avoiding) unnecessary detection attempts at arbitrary locations that consume power. In some examples, the subject technology of enhanced inter-frequency detection can provide useful benefits in high-Doppler use cases (e.g., high-speed moving train scenario).

In an aspect of the disclosure, a method, a computer-readable medium, and a apparatus are provided. The apparatus may be a UE. The apparatus is configured to determine whether a neighbor cell associated with a first frequency is misaligned with a serving cell associated with a second frequency different than the first frequency based on first measurements of the neighbor cell within a first measurement gap window having a first length. The apparatus is also configured to detect a location of at least one synchronization signal block (SSB) associated with the neighbor cell within a second measurement gap window having a second length greater than the first length based on the determining that the neighbor cell is misaligned with the serving cell. The apparatus is also configured to determine an alignment offset between the location of the at least one SSB associated with the neighbor cell and the first measurement gap window. The apparatus is also configured to obtain second measurements of the neighbor cell within a third measurement gap window that includes the location of the at least one SSB associated with the neighbor cell based on the alignment offset and one or more parameters of the at least one SSB associated with the neighbor cell.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
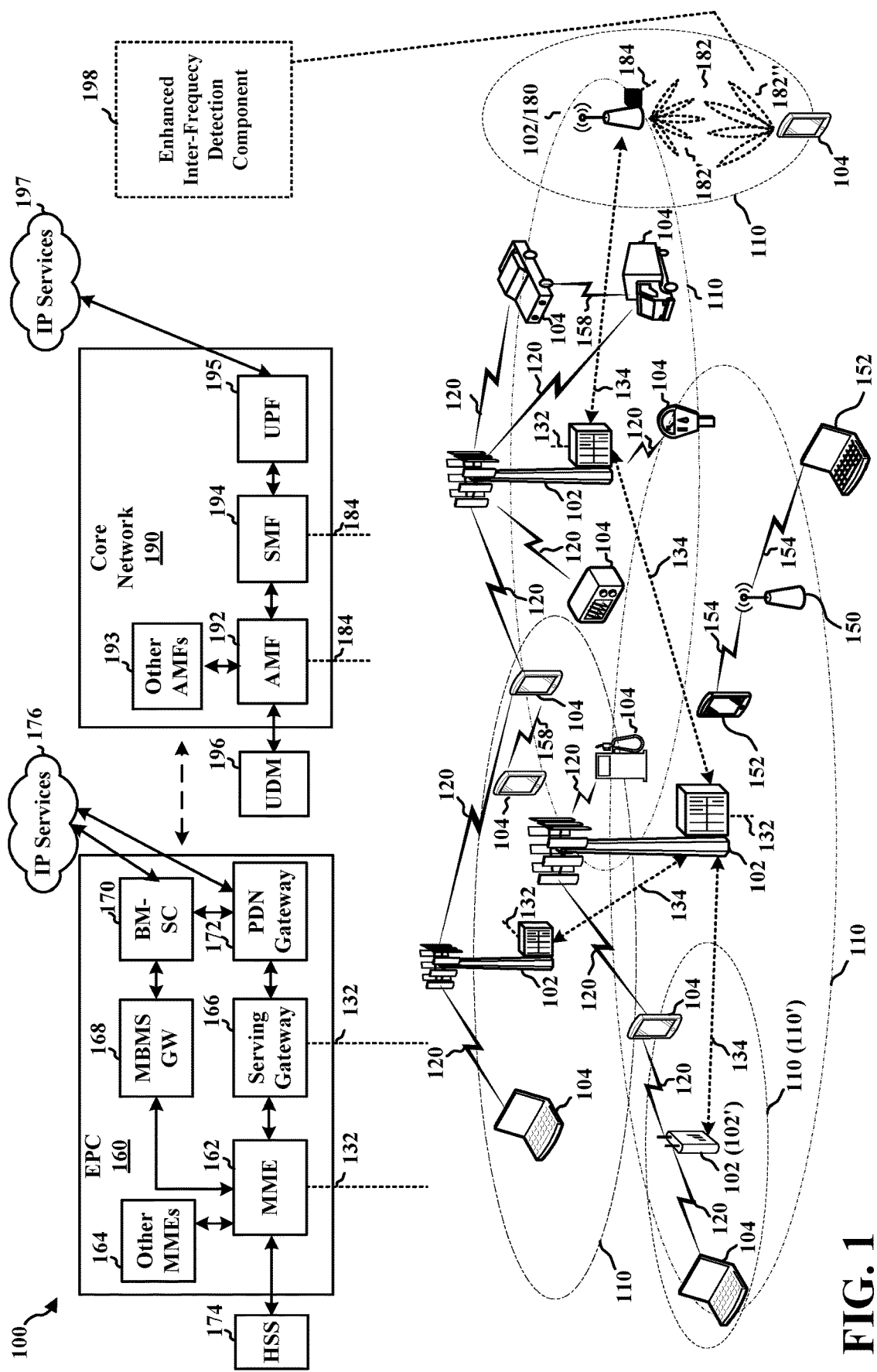
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., 51 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Aspects of the present disclosure are also applicable to various handover configurations, including but not limited to, between a standalone 5G NR cell and a standalone 5G NR cell, between a non-standalone cell (e.g., via an LTE eNB cell) and a standalone 5G NR cell, and between a non-standalone cell (e.g., NR Dual-Connectivity cell) to a standalone 5G NR cell. Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

The present disclosure is related to inter-frequency operations for wireless communications. Conventionally, inter-frequency measurement operations may be based on a network measurement gap configuration. For example, a network may specify a network measurement gap (i.e., a network generated or network wide measurement gap) or network measurement gap parameters (i.e., network generated or network wide parameters) that can be used by devices (e.g., UEs) to determine the network measurement gap. The devices can then use the network measurement gap to align control messaging and/or windows of different frequencies. For example, a UE may align a measurement gap of a first base station associated with a first frequency with an SMTC window of a second base station associated with a second frequency in order to add the second base station as a secondary cell group (SCG). However, when performing such conventional inter-frequency operations and measurement, the measurement gap or parameters thereof may be incorrect for one or more reasons. For example, the timings of the different base stations may not be synchronized or may be synchronized but drift from each other. As another example, a timing parameter (e.g., offset value) between the two base stations may be incorrect, which results in an incorrect measurement gap determination or misaligned measurement windows. Such procedures may not achieve high throughput and/or reliability. In a multi-cell scenario, where two or more 5G NR cells are misaligned with respect to system frame number (SFN) and/or time, neighbor cell detection can fail, resulting in the UE being stuck to a low-coverage and/or low-throughput cell. This may be due to differing SSB periodicities between 5G NR cells.

Various aspects and techniques discussed below are generally directed to improving communication system operations. Some described techniques relate to improved methods, systems, devices, and apparatuses that support enhanced inter-frequency detection procedures, including device based measurement gap configuration operations. For example, a UE may generate a customized measurement gap, extend measurement gap windows, or shift measurement gap windows to align particular control messages or windows of different base stations. To illustrate, a UE may generate a customized measurement gap to align a measurement gap of a first 5G cell to a SMTC window of a second 5G cell. As a result, SSB searching and/or measurement may be more efficient at the UE. As another illustration, a UE may extend an existing base station control window. For example, a UE may extend a measurement gap to align the measurement gap of a first 5G cell with an SMTC window of a second 5G cell such that SSB beam locations of the second 5G cell can be detected at the first 5G cell. Such enhanced inter-frequency detection and measurement gap operations may enable enhanced operation between base stations, such as improved reliability in cell addition. For example, a device may more quickly and more successfully join a secondary cell group or account for timing drift or time shifting while connected. Accordingly, such techniques may increase reliability and throughput.

During operation, devices of access network 100 transmit control, data, and/or sidelink channel transmissions to other devices of access network 100. For example, UE (e.g., 104) and a base station (e.g., 102/180) may transmit control and data information on control and data channels. Multiple end devices or UEs may transmit control and data information on one or more sidelink channels directly to each other and independent of a base station of access network 100. One or more of the end devices or UEs may perform inter-frequency detection and measurement gap management operations. For example, UE 104 may receive measurement gap information and/or SSB information. Additionally, UE 104 may determine whether to modify an existing measurement gap or generate a separate measurement gap in order to align the measurement gap with an SMTC window based on the SSB periodicity.

In one or more implementations, the UE 104 may receive a measurement configuration transmission (not shown) via one or more beams from a second base station 180. The measurement configuration transmission may include measurement gap parameters, SSB gap (e.g., SMTC parameters), or a combination thereof. The UE 104 can perform inter-frequency operations responsive to receiving the measurement configuration transmission. For example, the UE 104 can monitor for SSBs from the second base station 180 during a control window (e.g., measurement gap window) for the second base station 180.

If the UE 104 receives the SSBs of the second base station 180, the UE 104 can add the second base station 180 as a secondary cell group. If the UE 104 does not receive the SSBs, the UE 104 may perform enhanced inter-frequency measurement gap operations, as described further with reference to FIGS. 4-8. For example, the UE 104 may modify a measurement gap to successfully receive the SSBs of the second base station 180. To illustrate, the UE 104 may extend a measurement gap up to a specified measurement gap length to align the adjusted measurement gap with an SMTC window of the second base station 180 to successfully receive the SSBs.

Thus, FIG. 1 describes enhanced inter-frequency detection and measurement gap operations for multiple network operations. Using enhanced inter-frequency detection and measurement gap operations may enable improvement when operating with multiple base stations and/or networks. Performing enhanced inter-frequency detection and measurement gap operations enables a network to improve throughput and reliability.

Referring again to FIG. 1, in certain aspects, the enhanced inter-frequency detection component 198 may be configured to determine whether a neighbor cell associated with a first frequency is misaligned with a serving cell associated with a second frequency different than the first frequency based on first measurements of the neighbor cell within a first measurement gap window having a first length. The enhanced inter-frequency detection component 198 also may be configured to detect a location of at least one synchronization signal block associated with the neighbor cell within a second measurement gap window having a second length greater than the first length based on the determining that the neighbor cell is misaligned with the serving cell. The enhanced inter-frequency detection component 198 also may be configured to determine an alignment offset between the location of the at least one SSB associated with the second cell and the first measurement gap window. The enhanced inter-frequency detection component 198 also may be configured to obtain second measurements of the neighbor cell within a third measurement gap window that includes the location of the at least one SSB associated with the neighbor cell based on the alignment offset and one or more parameters of the at least one SSB associated with the neighbor cell.

Figure 2:
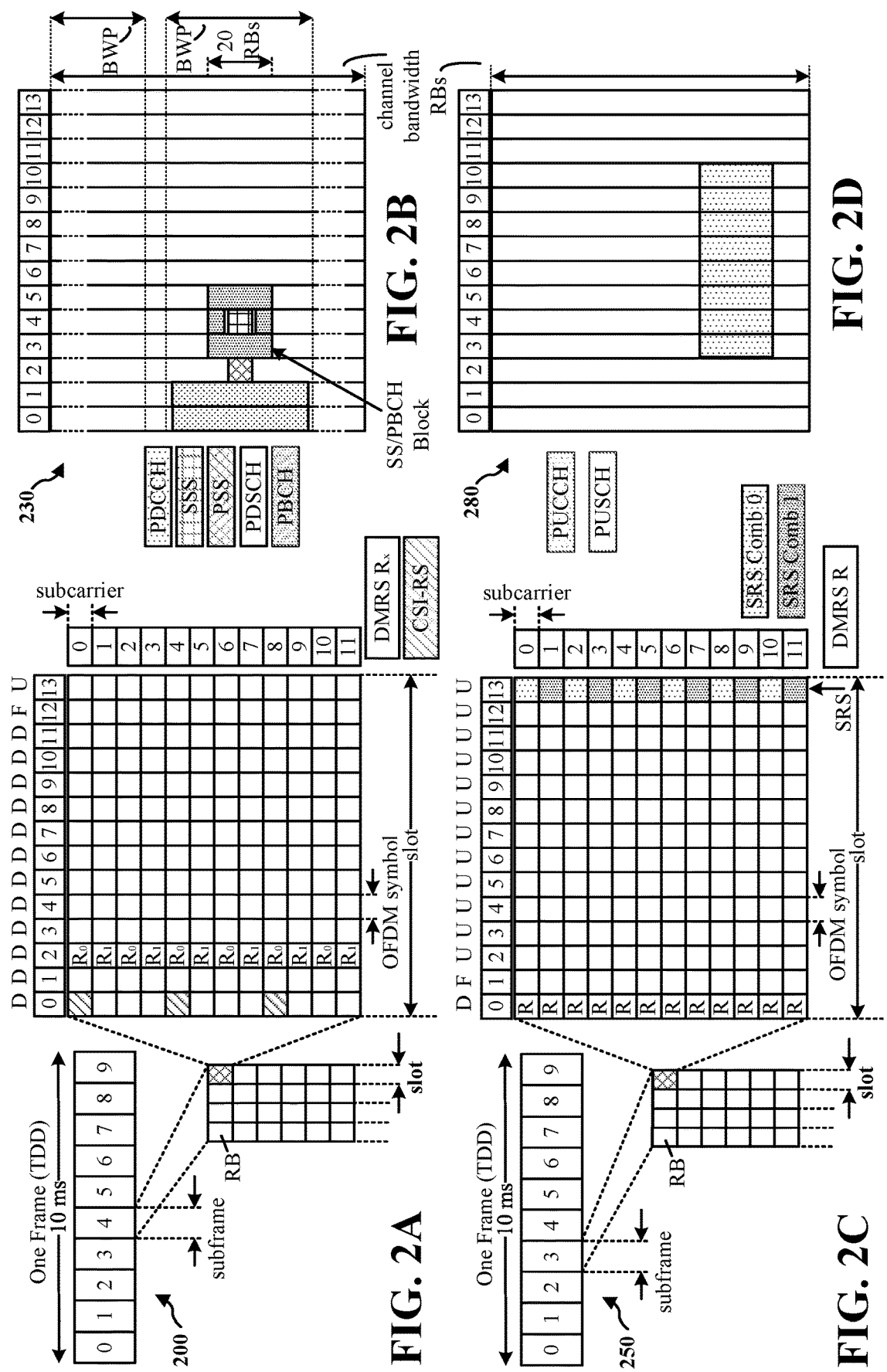
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kilohertz (kHz), where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where $100x$ is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Figure 3:
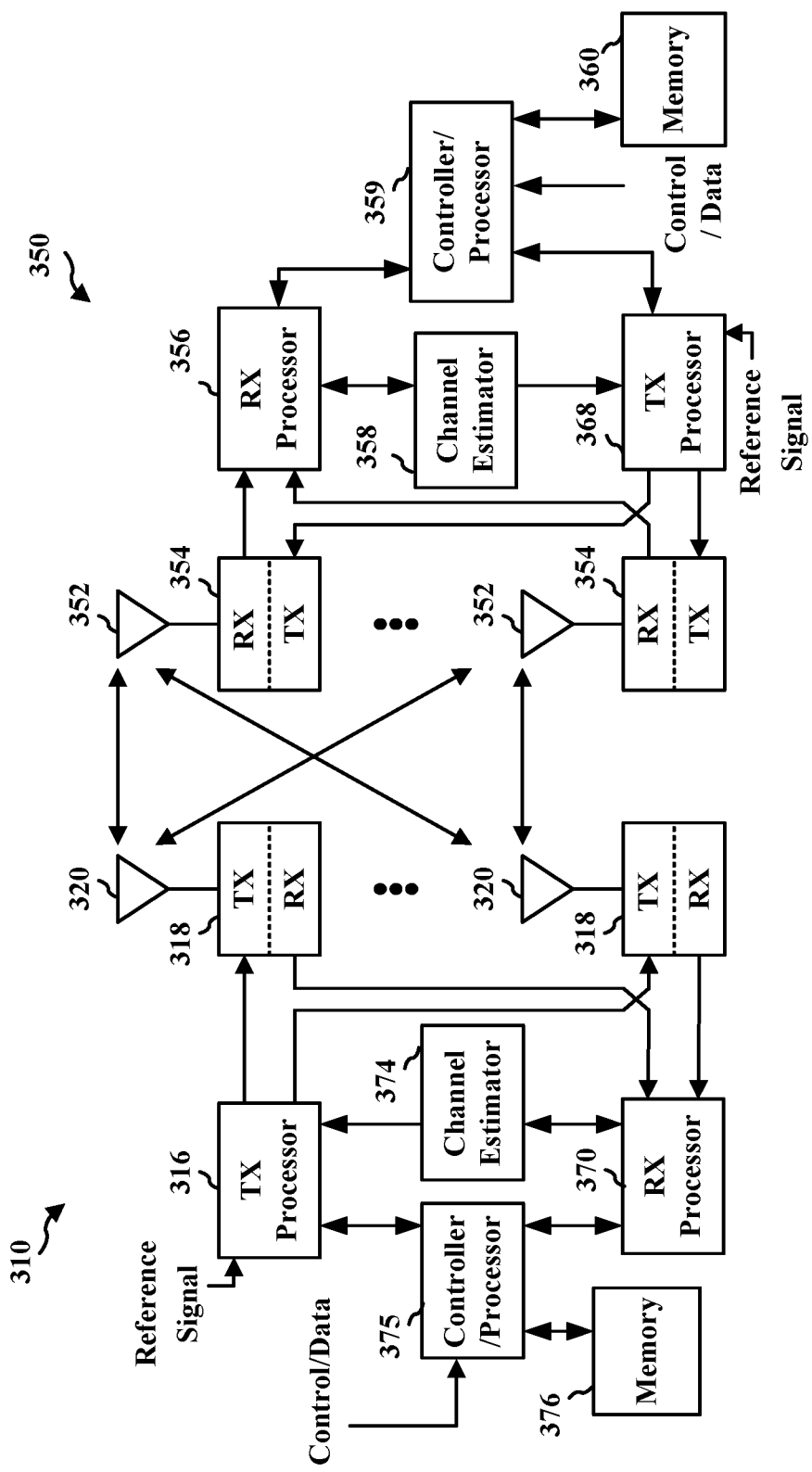
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

In some aspects, at least one of the TX processor 368, the RX processor 356, and the controller/processor 359 may be configured to perform aspects in connection with the enhanced inter-frequency detection component 198 of FIG. 1.

Referring to FIGS. 4-8, techniques and solutions to improving inter-frequency detection between base stations in various RANs, such as 5G NR RANs, are shown. Communication by base stations and UEs may occur at least partially within a mmW (e.g., potentially including near-mmW) spectrum in such RANs. For example, 5G NR RANs may include frequency range 2 (FR2) that includes frequency bands from approximately 24.25 GHz to 52.6 GHz. Such mmW deployment may include some small cells having a relatively smaller coverage area than other cells (e.g., macro cells) in lower bands (e.g., sub-6 GHz bands) and/or legacy RANs (e.g., LTE).

Aspects of the present disclosure are also applicable to various handover configurations, including but not limited to, between a standalone 5G NR cell and a standalone 5G NR cell, between a non-standalone cell (e.g., via an LTE eNB cell) and a standalone 5G NR cell, and between a non-standalone cell (e.g., NR Dual-Connectivity cell) to a standalone 5G NR cell. Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

Communication in mmW spectrums, including FR2 for 5G NR, may be relatively less robust than communication in lower bands (e.g., sub-6 GHz bands). For example, mmW communication (e.g., beam paths) may be adversely affected by the environment, including blockers, reflective surfaces, etc., which may a line-of-sight (LoS) path between a base station and a UE. In response to the relatively unpredictable and unreliable characteristics commensurate with communication in mmW access networks, mmW deployments may include a large number of base stations. In particular, mmW deployments may include many small cells and/or SCells within one geographic coverage area, such he coverage area of a macro base station (e.g., gNB). The large number of base stations may increase the frequency with which a UE is handed over between base stations.

Base stations may make handover decisions for UEs based on measurement reporting by the UEs. The measurement reports may indicate the respective qualities of channels between the UE and a set of base stations, such as the source base station with which the UE is connected and one or more target base stations to which the UE may connect. However, in a multi-cell scenario, where two or more cells (e.g., a serving cell and a neighbor cell) are misaligned with respect to system frame number (SFN) and/or time, neighbor cell detection can fail, resulting in the UE remaining connected to a low-coverage and/or a low-throughput cell. This may be due to differing SSB periodicities between 5G NR cells. In view of the foregoing, a need exists for approaches to address inter-frequency detection when multi-cell misalignment exists.

Thus, FIGS. 4-8 provide for improved inter-frequency detection between base stations. In case of misalignment between base stations, the UE can generate a SMTC periodicity-based measurement gap (e.g., OTA gap plus one or more subframes) that is combined with or separate from an originally configured measurement gap. Once the UE determines the SSB location, the UE can further enhance measurement gap duration and help with reducing data outage occurrences and increasing throughput and/or reliability during idle mode mobility scenarios.

Figure 4:
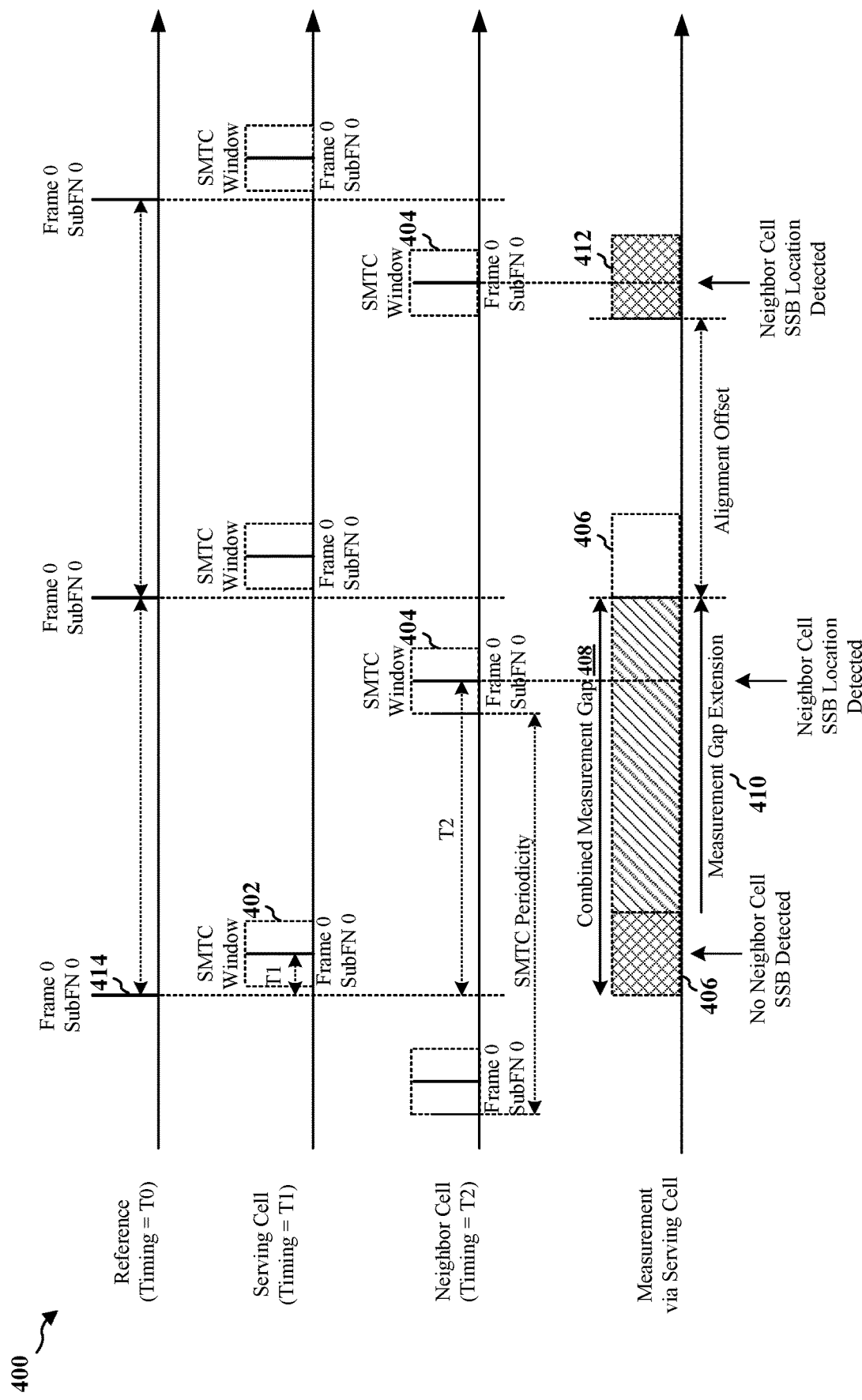
FIG. 4 is a timing diagram illustrating an example of measurement gap misalignment between a serving cell and neighbor cell.

FIG. 4 is a timing diagram illustrating an example of a measurement gap misalignment between two base stations. In FIG. 4, a measurement gap 406 of a serving cell and an SMTC window 404 of a neighbor cell are not aligned due to a timing misalignment between the two cells. To illustrate, a timing difference is caused by a SMTC window mismatch between the two cells. For example, the SMTC window 404 for the neighbor cell is different from and mismatched with a SMTC window 402 for the serving cell such that the SSB locations between the two cells are not aligned. Specifically, a frame (e.g., SFN) of the serving cell does not share a start time or an end time with a corresponding frame of the neighbor cell. Said another way, a frame (e.g., start and end times thereof) of the neighbor cell is offset from a corresponding frame of the serving cell. Such a timing difference may be caused by a lack of a synchronization between the two cells or a timing drift between the two cells. A timing drift may occur in some networks, such as frequency division duplexing networks, due to a lack of a timing synchronization, such as the robust or strict timing synchronization present in time division duplexing networks. As described with reference to FIG. 4, under such circumstances, a UE may not be able to monitor the SMTC window 404 and detect the SSB location of the neighbor cell because the measurement gap 406 may not be aligned with the SMTC window 404 of the neighbor cell. Accordingly, the UE may need to modify the management gap 406 to enable inter-frequency detection between the two cells, as described in FIGS. 5-8. Additionally, other parameters may differ or be mismatched, such as a measurement gap repetition period (MGRP), a measurement gap length (MGL) and/or a SMTC duration.

The measurement gap 406 may be modified in a variety of manners. To illustrate, the UE may extend the measurement gap 406 (e.g., detection window) by a set value (e.g., about 21 ms). For example, the UE may add a default or base window length value to the current detection window (e.g., 410). In some aspects, the UE may keep extending the detection window until a SSB is detected. In other implementations, the UE may open a new and separate measurement gap (e.g., 412) with a new window length that includes the length of the SSB periodicity and duration of one or more subframes (e.g., for a total window length of about 21 ms). Increasing the detection window size and increasing the amount of length added may reduce the time or number of cycles to receive an SSB at the cost of increased overhead or throughput. Thus, a UE or network may adjust the detection window length value to best accommodate network resources or requirements. For example, in low data rate conditions, the UE may extend the measurement gap window by a large amount or exponentially to quickly detect a SSB without sacrificing transmissions losses.

Figure 5:
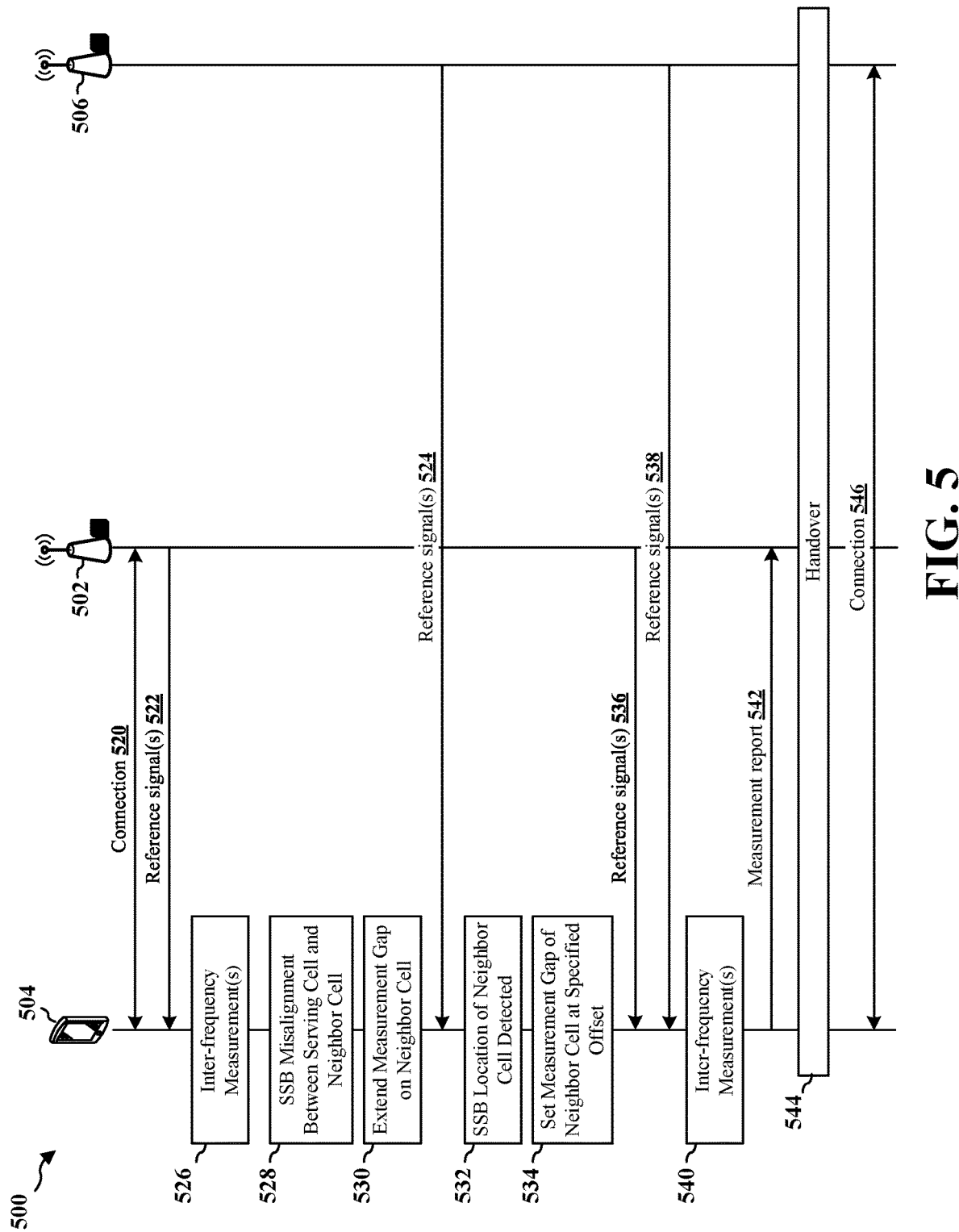
FIG. 5 is a call flow diagram illustrating an example of inter-frequency misalignment between a serving cell and neighbor cell.

FIG. 5 is a call flow diagram illustrating an example operations in an access network 500. The access network 500 includes, inter alia, a UE 504 and a set of base stations 502, 506. With respect to the UE 504, a first base station 502 may be referred to as a "serving cell," whereas a second base station 506 may be referred to as a "neighbor cell." In the context of FIGS. 1 and 3, the first base station 502 may be implemented as the base station 102/180 and/or the base station 310, the UE 504 may be implemented as the UE 104 and/or the UE 350, and/or the second base station 506 may be implemented as the base station 102/180' and/or the base station 310'.

According to various aspects, the UE 504 and the first base station 502 may have a connection 520 configured for communication—e.g., the connection 520 may include one or more uplink channels and/or one or more downlink channels on which the UE 504 and the first base station 502 are configured to communicate. Illustratively, the connection 520 may include operation, by the UE 504, on a cell provided by the first base station 502 (e.g., camping), and/or may include synchronization of the UE 504 with the first base station 502 for at least one of uplink and/or downlink communication. In this regard, the first base station 502 can be considered as a "serving cell."

The second base station 506 may be located separately from the first base station 502 and, initially, the UE 504 may be unconnected (e.g., unsynchronized) with the second base station 506. For example, the second base station 506 may be a neighboring base station of the first base station 502 and/or may be proximate to the UE 504 (e.g., the UE 504 may be at a cell edge of the second base station 506). In this regard, the second base station 506 can be considered as a "neighbor cell." At some point, then, the first base station 502 may be considered a "source" base station, and the second base station 506 may be considered a "target" base station, e.g., with respect to handover of the UE 504 in the access network 500.

In the access network 500, each of the first base station 502 and the second base station 506 may transmit a respective set of RSs 522, 524. For example, each set of RSs 522, 524 may include SSBs, CSI-RSs, and/or other RSs. The UE 504 may receive the first and second sets of RSs 522, 524 from the first and second base stations 502, 506, respectively, and the UE 504 may determine a set of measurements 526 based on each of the first and second sets of RSs 522, 524.

At 528, the UE 504 may determine whether a neighbor cell (e.g., the second base station 506) associated with a first frequency is misaligned with a serving cell (e.g., the first base station 502) associated with a second frequency different than the first frequency based on first measurements of the second base station 506 within a first measurement gap window having a first length. For example, the UE 504 may conclude that the two base stations are misaligned by determining that the at least one SSB associated with the second base station 506 is not detected within the first measurement gap window. As such, the UE 504 may conclude that the second base station 506 is asynchronous with the first base station 502 based on the determining that the second base station 506 is misaligned with the first base station 502. In other examples, the UE 504 may detect whether the location of the SSB associated with the second base station 506 is present within the first measurement gap window. The UE 504 may determine that the second base station 506 is not misaligned with the first base station 502 based on the detecting of the SSB location of the second base station 506 within the first measurement gap window. As such, the UE 504 may conclude that the second base station 506 is synchronous with the first base station 502 based on the determination that the second base station 506 is not misaligned with the first base station 502. Referring back to FIG. 4, the first measurement gap window may be similar to the measurement gap 406.

At 530, the UE 504 adjusts the first measurement gap by extending the first measurement gap of the second base station 506 to form a second measurement gap window having a second length greater than the first length. For example, the first measurement gap may be adjusted from the first length to the second length. In this regard, at least a portion of the second measurement gap window can overlap in time with the first measurement gap window. In some aspects, the first length of the first measurement gap window may correspond to a window length of about 6 ms. In some aspects, the second length of the second measurement gap window may be based on the SSB burst periodicity. In particular, the second measurement gap length may include a duration of the SSB burst periodicity (e.g., about 20 ms) and one or more subframes (e.g., about 1 ms) for a total measurement gap length of about 21 ms. In other implementations, the second measurement gap may be separate from the first measurement gap such that the second measurement gap window is non-overlapping in time with the first measurement gap window. Although specified values are provided for explanatory purposes of the measurement gap window lengths, the values may be any arbitrary value depending on implementation. Referring back to FIG. 4, the second measurement gap window may be similar to the combined measurement gap 408.

At 532, the UE 504 may detect the SSB location of the second base station 506. For example, the UE 504 may receive one or more SSB beams of at least a portion of the SMTC window of the second base station 506 within the second measurement gap. To illustrate, referring back to FIG. 4, the combined measurement gap 408 includes the original measurement gap 406 and a measurement gap extension 410 of a set value such that at least a portion of the combined measurement gap 408 overlaps in time with the SMTC window 404 of the second base station 506. In this regard, the SSB location of the second base station 506 can be detected at a particular time (e.g., slot or symbol) within the combined measurement gap 408, of which such SSB location is offset by a timing offset (e.g., T2) relative to a reference SSB location (e.g., Frame 0, Subframe Number 0).

At 534, the UE 504 may set a new measurement gap of the second base station 506 at a specified offset (e.g., an alignment offset). For example, the UE 504 may determine the alignment offset between the location of the at least one SSB associated with the second base station 506 and the first measurement gap window. In some aspects, in determining the alignment offset, the UE 504 may calculate a first timing offset between a first time at which a reference SSB is located and a second time at which a first SSB associated with the serving cell is located. To illustrate, referring back to FIG. 4, the first timing offset (denoted as "T1") can be calculated as the time difference between the SSB of the serving cell located within the SMTC window 402 and a reference SSB 414. The UE 504 also can calculate a second timing offset (denoted as "T2") between the first time at which the reference SSB 414 is located and a third time at which a second SSB associated with the neighbor cell is located. To illustrate, the second timing offset can be calculated as the time difference between the SSB of the neighbor cell located within the SMTC window 404 and the reference SSB 414. In one or more implementations, the alignment offset may correspond to a difference between the first timing offset and the second timing offset (e.g., T2-- T1).

To illustrate, the UE 504 may initiate a third measurement gap window at a time that is aligned with a system frame number (SFN) of the second base station 506 that includes the SMTC window of the second base station 506 and the location of the at least one SSB associated with the second base station 506 based on alignment offset. Referring back to FIG. 4, the third measurement gap window may be similar to the measurement gap 412, where the third measurement gap window includes parameters that correspond to one or more parameters of the first measurement gap 406 (e.g., measurement gap length, among others). In one or more implementations, the third measurement gap is offset relative to the first measurement gap. For example, the third measurement gap may be shifted by the alignment offset from a start time of the first measurement gap or from an end time of the first measurement gap, depending on implementation. In some aspects, the third measurement gap window has a third length that corresponds to the first length of the first measurement gap window. For example, each of the first and third measurement gaps has a length of about 6 ms. In some aspects, the third measurement gap window is non-overlapping in time with the first measurement gap window and the second measurement gap window.

In the access network 500, each of the first base station 502 and the second base station 506 may subsequently transmit a respective set of RSs 536, 538. For example, each set of RSs 536, 538 may include SSBs, CSI-RSs, and/or other RSs. The UE 504 may receive the first and second sets of RSs 536, 538 from the first and second base stations 502, 506, respectively, and the UE 504 may determine a set of measurements 540 based on each of the first and second sets of RSs 536, 538.

In some aspects, the UE 504 may determine at least one first value associated with the first base station 502 based on receiving the RSs 536 from the first base station 502. For example, the UE 504 may determine (e.g., measure, calculate, etc.) at least one of a reference signal receive power (RSRP), reference signal receive quality (RSRQ), signal-to-noise ratio (SNR), signal-to-interference-plus-noise ratio (SINR), reference signal strength indicator (RSSI), and/or other value(s) based on receiving at least one of the RSs 536. The UE 504 may determine at least a portion of the set of measurements 540 based on the at least one first value. For example, the UE 504 may include, in the set of measurements 540, information indicating the at least one first value associated with the first base station 502.

In some aspects, the UE 504 may determine at least one second value associated with the second base station 506 based on receiving the RSs 538 from the second base station 506. For example, the UE 504 may determine (e.g., measure, calculate, etc.) at least one of an RSRP, RSRQ, SNR, SINR, RSSI, and/or other value(s) based on receiving at least one of the RSs 538. The UE 504 may determine at least a portion of the set of measurements 540 based on the at least one second value. For example, the UE 504 may include, in the set of measurements 540, information indicating the at least one second value associated with the second base station 506.

The UE 504 may generate and transmit a measurement report 542 based on the set of measurements 540. In some aspects, one of more of the set of measurements 540 may trigger transmission of the measurement report 542 by the UE 504, such as when the at least one first value fails to satisfy (e.g., is less than) one event threshold and/or when the at least one second value satisfies (e.g., meets or exceeds) another event threshold.

In some other aspects, the UE 504 may include, in the measurement report 542, information indicating the at least one first value associated with the first base station 502 and/or information indicating the at least one second value associated with the second base station 506. Illustratively, the measurement report 542 may include at least one first RSRP measured by the UE 504 from the RSs 536 received from the first base station 502 and/or the measurement report 542 may include at least one second RSRP measured by the UE 504 from the RSs 538 received from the second base station 506.

In still other aspects, the UE 504 may include, in the measurement report 542, information that is based on the set of measurements 540. For example, the measurement report 542 may include information indicating comparison(s) of the at least one first value associated with the first base station 502 with the at least one second value associated with the second base station 506. In another example, the measurement report 542 may include information indicating result(s) of mathematical function(s) (e.g., addition, subtraction, etc.) in which the at least one first value associated with the first base station 502 and/or the at least one second value associated with the second base station 506 are used as variable(s)/input(s).

The first base station 502 may receive the measurement report 542 from the UE 504, and based thereon, the first base station 502 may make a handover determination to initiate a handover 544 of the UE 504. The first base station 502 may make the handover determination to determine whether the UE 504 should be handed over. That is, the first base station 502 may make the handover determination to determine if the UE 504 should be handed over the to the second base station 506 or if the connection 520 with the UE 504 should be maintained.

The first base station 502 may make the handover determination based on information in the measurement report 542 indicating which of the channel qualities between one of the base stations 502, 506 and the UE 504 is "better" relative to the other. For example, the first base station 502 may determine whether the channel quality between the second base station 506 and the UE 504 is better than the channel quality between the first base station 502 and the UE 504 based on the first RSRP measured by the UE 504 from the RSs 536 received from the first base station 502 and/or based on the second RSRP measured by the UE 504 from the RSs 538 received from the second base station 506. For example, the first base station 502 may determine whether the second RSRP is relatively greater than the first RSRP, e.g., by a threshold amount.

If the first base station 502 determines that that the channel quality between the UE 504 and the second base station 506 is unsatisfactory (e.g., lower than the channel quality between the UE 504 and the first base station 502), then the first base station 502 may make a handover determination that the UE 504 should not be handed over to the second base station 506. That is, when the first base station 502 makes a handover determination to refrain from initiating handover of the UE 504 to the second base station 506, the first base station 502 may maintain the connection 520 with the UE 504.

However, if the first base station 502 determines that the channel quality between the UE 504 and the second base station 506 is satisfactory (e.g., better/higher than the channel quality between the UE 504 and the first base station 502), then the first base station 502 may make a handover determination to initiate handover of the UE 504 to the second base station 506. Upon a handover determination to initiate the handover 544 of the UE 504, the first base station 502 may transmit a handover request to the second base station 506. The first base station 502 may include information identifying the UE 504 in the handover request.

Correspondingly, the second base station 506 may receive the handover request from the first base station 502. The second base station 506 may perform admission control based on the received handover request. According to some aspects, the second base station 506 may perform admission control by determining the current load on the neighbor cell of the second base station 506, determining the QoS class identifier (QCI) of a bearer associated with the UE 504, estimating the increase on the cell load caused by establishing such a bearer, determining a resource allocation for the cell, and/or other operation(s) associated with establishing a connection with the UE 504.

Once the second base station 506 performs admission control for the UE 504 (and determines the UE 504 can be admitted to the neighbor cell), the second base station 506 may transmit a handover acknowledgement to the first base station 502 in response to the handover request. The first base station 502 may receive the handover acknowledgement from the second base station 506, and based thereon, the first base station 502 may transmit a handover command to the UE 504.

The UE 504 may receive, from the first base station 502, the handover command, which may cause the UE 504 to release the connection 520 with the first base station 502 and establish a connection 546 with the second base station 506. In some aspects, the UE 504 may establish the connection 546 with the second base station 506 by performing a random access channel (RACH) procedure with the second base station 506. For example, the UE 504 may perform a contention-free RACH procedure with the second base station 506 in which the UE 504 is assigned a preamble by the second base station 506 and the UE 504 transmits a RACH request to the second base station 506 that includes the assigned preamble.

Figure 6:
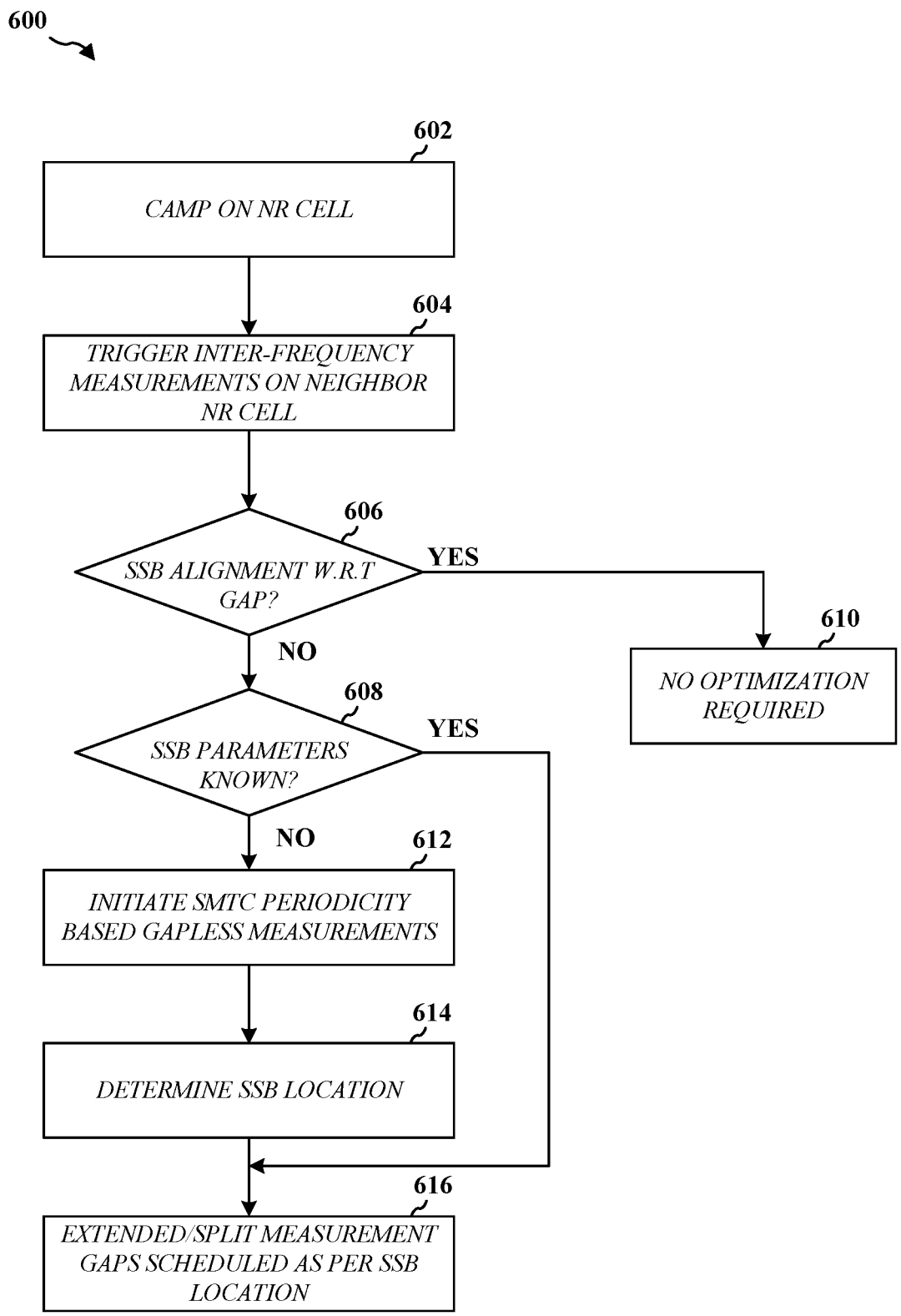
FIG. 6 is a flowchart of a method of inter-frequency detection between misaligned base stations.

FIG. 6 is a flowchart of a process 600 of wireless communication. The process 600 may be performed by a UE (e.g., the UE 104, 350, 504), which may include the memory 360 and which may be the entire UE or a component of the UE, such as the TX processor 368, the RX processor 356, and/or the controller/processor 359. As illustrated, the process 600 includes a number of enumerated steps, but implementations of the process 600 may include additional steps before, after, and in between the enumerated steps. In some implementations, one or more of the enumerated steps may be omitted or performed in a different order.

At 602, the UE may camp on a serving cell associated with a first frequency. The UE can camp on the serving cell, e.g., as described in connection with FIGS. 1-5. For instance, 602 may be performed by one or more components described with respect to FIG. 3, e.g., controller/processor 359, receive processor 356, transmit processor 368, receiver/transmitter 354 and/or antenna 352. The camping of the cell may be performed, e.g., by the connection management component 852 of the apparatus 802 in FIG. 8. In some aspects, the UE may camp on the serving cell for normal service operation. In some aspects, the UE may camp on the serving cell to initiate a cell reselection evaluation procedure by obtaining measurements of any neighboring cells.

At 604, the UE may trigger inter-frequency measurements of a neighbor cell via the serving cell. The UE can obtain inter-frequency measurements of the serving cell and of one or more neighbor cells, e.g., as described in connection with FIGS. 1-5. For instance, 604 may be performed by one or more components described with respect to FIG. 3, e.g., controller/processor 359, receive processor 356, receiver/transmitter 354 and/or antenna 352. The measurements may be obtained, e.g., by the measurement component 840 of the apparatus 802 in FIG. 8. In the context of FIG. 5, the UE 504 may obtain the inter-frequency measurements 526 of the first base station 502 and the second base station 506 (referred to as the "neighbor cell").

At 606, the UE may determine whether there is SSB alignment with respect to the measurement gap. For example, the UE may determine whether the measurement gap is aligned with the SMTC window of the neighbor cell by detecting any SSBs of the neighbor cell within the measurement gap. The UE can determine the SSB alignment, e.g., as described in connection with FIGS. 1-5. For instance, 606 may be performed by one or more components described with respect to FIG. 3, e.g., controller/processor 359, receive processor 356, receiver/transmitter 354 and/or antenna 352. The SSB alignment determination may be performed, e.g., by the SSB alignment component 844 of the apparatus 802 in FIG. 8. In the context of FIG. 5, the UE 504 may determine whether the measurement gap is misaligned with the SMTC window of the second base station 506 by detecting whether any SSB beam of the second base station 506 is received within the open measurement gap. If no SSBs of the second base station 506 are received within the measurement gap, then the UE can conclude that the first base station 502 and the second base station 506 are misaligned and are operating asynchronous of one another. In this regard, the process 600 may proceed to block 608. Otherwise the process 600 proceeds to block 610.

At 608, the UE may determine whether parameters of the SSB for the neighbor cell are already known (e.g., through a prior optimization procedure). If the SSB parameters are known, then the process 600 proceeds to block 616. Otherwise, the process 600 proceeds to block 612. In some examples, the SSB parameters may include SSB burst periodicity, the number of SSBs within a SSB burst, SMTC window periodicity, SMTC window duration, measurement gap offsets, etc. The UE may store network settings data that includes or corresponds to data associated with network measurement gap parameters and settings. The network settings data may also include data associated with a second measurement gap or control window, such as an SMTC window. The UE also may store local settings data that includes or corresponds to data associated with local measurement gap parameters and settings, also referred to as customized measurement gap parameters or modified measurement gap parameters. The local settings data may indicate or include measurement gap parameter data or SSB measurement gap parameter data, such as SMTC parameters. The measurement gap parameters may include or correspond to measurement gap repetition period (MGRP), a measurement gap offset (e.g., gapOffset), a measurement gap length (MGL), or a combination thereof. The measurement gap parameters may be used to determine the local measurement gap and to align the local measurement gap with the SMTC window.

At 610, the UE concludes there is SSB alignment with respect to the measurement gap. To illustrate, referring back to FIG. 4, the UE determines SSB alignment exists by detecting one or more SSBs of the neighbor cell within the measurement gap 406. By detecting SSBs of the neighbor cell within the measurement gap 406, the measurement gap 406 is determined to be aligned with the SMTC window of the neighbor cell. As such, no optimization of the measurement gap is required.

At 612, the UE may initiate SMTC periodicity based gapless measurements. If the UE does not receive the SSBs of the neighbor cell within the measurement gap, the UE may perform enhanced inter-frequency measurement gap operations. For example, the UE may modify a measurement gap to successfully receive the SSBs of the second base station 180. To illustrate, the UE may extend a measurement gap up to a specified measurement gap length to align the adjusted measurement gap with an SMTC window of the neighbor cell to successfully receive the SSBs. The measurement gap may be modified in a variety of manners. For example, the UE may extend the measurement gap (e.g., detection window) by a set value (e.g., about 21 ms). In some aspects, the UE may add a default or base window length value to the current detection window. In other aspects, the UE may open a new and separate measurement gap with a new window length that includes the length of the SSB periodicity and duration of one or more subframes (e.g., for a total window length of about 21 ms). The UE can resume the inter-frequency measurements using the adjusted measurement gap, e.g., as described in connection with FIGS. 1-5. For instance, 612 may be performed by one or more components described with respect to FIG. 3, e.g., controller/processor 359, receive processor 356, transmit processor 368, receiver/transmitter 354 and/or antenna 352. The SMTC periodicity based gapless measurements may be initiated, e.g., by the measurement component 840 through coordination with the measurement gap adjustment component 844 of the apparatus 802 in FIG. 8. In the context of FIG. 5, the UE 504 can adjust the measurement gap by extending the measurement gap of the second base station 506 to form a combined measurement gap window (e.g., original measurement gap length combined with measurement gap extension length) or a separate measurement gap window having a second length greater than the first length.

At 614, the UE may determine the SSB location of the neighbor cell. The UE detects the SSB location of the neighbor cell, e.g., as described in connection with FIGS. 1-5. For instance, 614 may be performed by one or more components described with respect to FIG. 3, e.g., controller/processor 359, receive processor 356, transmit processor 368, receiver/transmitter 354 and/or antenna 352. The SSB location of the neighbor cell can be detected, e.g., by the SSB alignment component 844 through coordination with the measurement component 840 and/or the determination component 842 of the apparatus 802 in FIG. 8.

At 616, the UE may determine extended/split measurement gaps scheduled as per the detected SSB location. The UE can determine the extended/split measurement gaps, e.g., as described in connection with FIGS. 1-5. For instance, 616 may be performed by one or more components described with respect to FIG. 3, e.g., controller/processor 359, receive processor 356, transmit processor 368, receiver/ transmitter 354 and/or antenna 352. To illustrate, the UE may set a new measurement gap of the neighbor cell at a specified offset (e.g., an alignment offset). For example, the UE may determine the alignment offset between the location of the detected SSB associated with the neighbor cell and the original measurement gap. The UE may then initiate a new measurement gap window at a time that is aligned with a SFN of the neighbor cell that includes (or overlaps in time with) the SMTC window of the neighbor cell and the location of the SSB associated with the neighbor cell based on alignment offset. The determination may be performed, e.g., by the timing offset component 848 through coordination with the SSB alignment component 844 and the determination component 842 of the apparatus 802 in FIG. 8.

Figure 7:
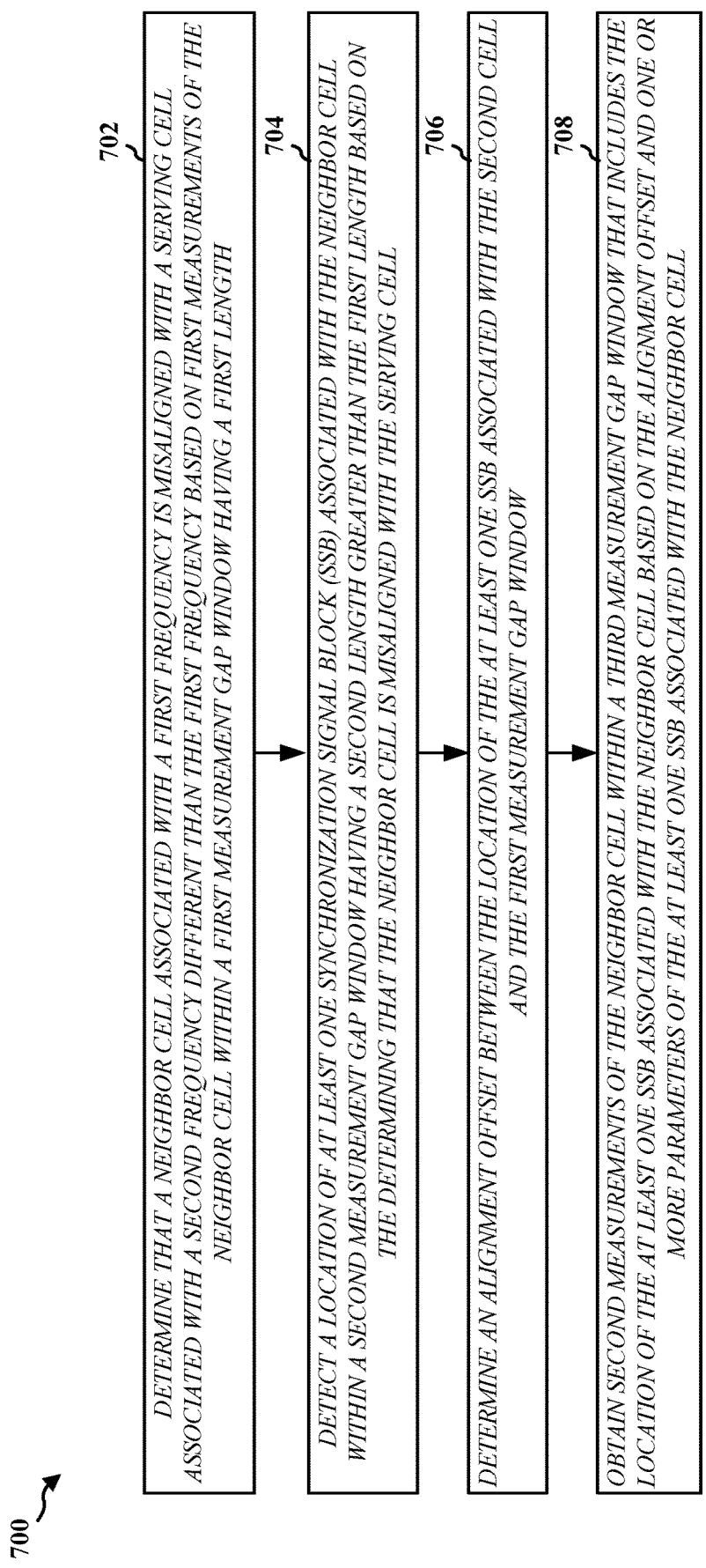
FIG. 7 is a flowchart of a method of wireless communication by a UE.

FIG. 7 is a flowchart of a process 700 of wireless communication. The process 700 may be performed by a UE (e.g., the UE 104, 350, 504), which may include the memory 360 and which may be the entire UE or a component of the UE, such as the TX processor 368, the RX processor 356, and/or the controller/processor 359. As illustrated, the process 700 includes a number of enumerated steps, but implementations of the process 700 may include additional steps before, after, and in between the enumerated steps. In some implementations, one or more of the enumerated steps may be omitted or performed in a different order.

At 702, the UE may determine whether a neighbor cell associated with a first frequency is misaligned with a serving cell associated with a second frequency different than the first frequency based on first measurements of the neighbor cell within a first measurement gap window having a first length, e.g., as described in connection with FIGS. 1-5. In some examples, the serving cell may be operating on a sub-6 GHz frequency band and the neighbor cell may be operating on a millimeter wave frequency band, or vice versa. In the context of FIG. 5, the UE 504 may determine whether the second base station 506 is misaligned with the first base station 502. In some instances, 702 may be performed by one or more components described with respect to FIG. 3, e.g., controller/processor 359, receive processor 356, transmit processor 368, receiver/transmitter 354 and/or antenna 352. The determination of whether the neighbor cell is misaligned with the serving cell may be performed, e.g., by the SSB alignment component 844 through coordination with the measurement component 840 and/or the determination component 842 of the apparatus 802 in FIG. 8. In some aspects, the UE may determine that that the at least one SSB associated with the neighbor cell is not detected within the first measurement gap window to conclude that the neighbor cell is misaligned with the serving cell. In this regard, the neighbor cell is asynchronous with the serving cell based on the determining that the neighbor cell is misaligned with the serving cell. In other aspects, the UE may determine that the neighbor cell is misaligned with the serving cell by determining that the first measurement gap window is misaligned with a SMTC window of the neighbor cell based on the first measurements. In other aspects, the UE may conclude that the neighbor cell and the serving cell are operating synchronous to one another by detecting that the location of the at least one SSB associated with the neighbor cell is present within the first measurement gap window, and by determining that the neighbor cell is not misaligned with the serving cell based on the detecting of the location of the at least one SSB associated with the neighbor cell within the first measurement gap window.

At 704, the UE may detect a location of at least one synchronization signal block (SSB) associated with the neighbor cell within a second measurement gap window having a second length greater than the first length based on the determining that the neighbor cell is misaligned with the serving cell, e.g., as described in connection with FIGS. 1-5. In the context of FIG. 5, the UE 504 may determine whether the neighbor cell 506 is misaligned with the serving cell 502. In some instances, 704 may be performed by one or more components described with respect to FIG. 3, e.g., controller/processor 359, receive processor 356, transmit processor 368, receiver/transmitter 354 and/or antenna 352. The location of at least one synchronization signal block associated with the neighbor cell may be detected, e.g., by the SSB alignment component 844 through coordination with the measurement component 840 and/or the determination component 842 of the apparatus 802 in FIG. 8. In some aspects, the UE may determine the second measurement gap window by adjusting the first measurement gap window from the first length to the second length. In some implementations, at least a portion of the second measurement gap window overlaps in time with the first measurement gap window. In other implementations, the second measurement gap window is non-overlapping in time with the first measurement gap window.

At 706, the UE may determine an alignment offset between the location of the at least one SSB associated with the neighbor cell and the first measurement gap window, e.g., as described in connection with FIGS. 1-5. In the context of FIG. 5, the UE 504 may determine the alignment offset between the location of at least one SSB associated with the serving cell 502 and a first measurement gap window (not shown). In some instances, 706 may be performed by one or more components described with respect to FIG. 3, e.g., controller/processor 359, receive processor 356, transmit processor 368, receiver/transmitter 354 and/or antenna 352. The alignment offset may be determined, e.g., by the SSB alignment component 844 through coordination with the measurement component 840 and/or the determination component 842 of the apparatus 802 in FIG. 8. In some aspects, the UE may determine the alignment offset by calculating a first timing offset between a first time at which a reference SSB is located and a second time at which a first SSB associated with the serving cell is located, and by calculating a second timing offset between the first time at which the reference SSB is located and a third time at which a second SSB associated with the neighbor cell is located, such that the alignment offset corresponds to a difference between the first timing offset and the second timing offset.

At 708, the UE may obtain second measurements of the neighbor cell within a third measurement gap window that includes the location of the at least one SSB associated with the neighbor cell based on the alignment offset and one or more parameters of the at least one SSB associated with the neighbor cell. In some aspects, the third measurement gap window is non-overlapping in time with the first measurement gap window and the second measurement gap window. The UE can obtain the second measurements, e.g., as described in connection with FIGS. 1-5. In some instances, 708 may be performed by one or more components described with respect to FIG. 3, e.g., controller/processor 359, receive processor 356, transmit processor 368, receiver/transmitter 354 and/or antenna 352. The second measurements may be obtained, e.g., by the measurement component 840 of the apparatus 802 in FIG. 8. In some aspects, the one or more parameters of the at least one SSB associated with the neighbor cell includes a SSB burst periodicity, in which the second length of the second measurement gap window is based on the SSB burst periodicity. In some aspects, the second length of the second measurement gap window includes a duration of the SSB burst periodicity and one or more subframes. In some aspects, the third measurement gap window has a third length that corresponds to the first length of the first measurement gap window. In one or more implementations, the UE may initiate the third measurement gap window at a time that is aligned with a SFN of the neighbor cell that includes the SMTC window of the neighbor cell and the location of the at least one SSB associated with the neighbor cell based on alignment offset.

Figure 8:
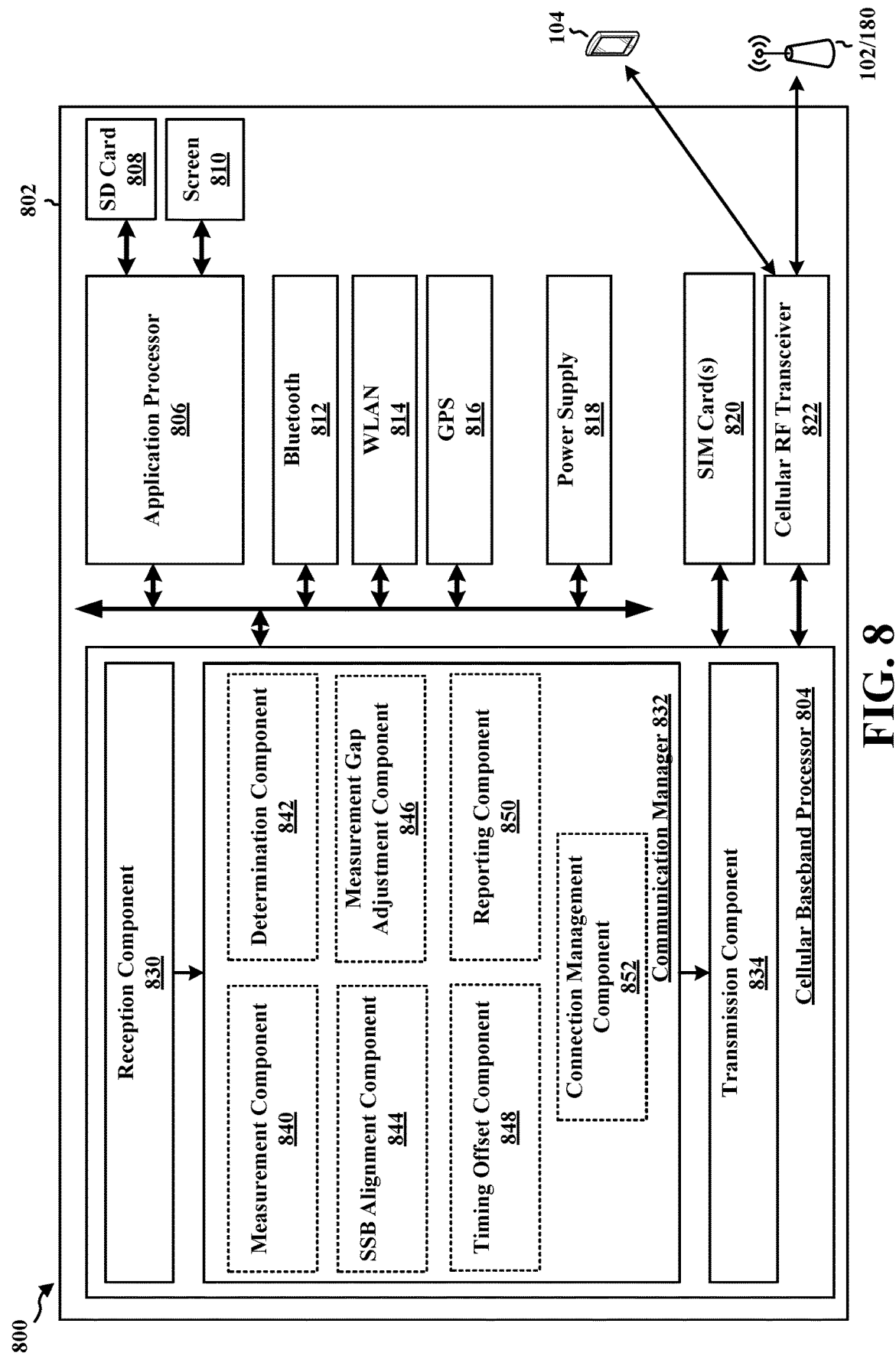
FIG. 8 is a diagram illustrating an example of a hardware implementation for an example apparatus at a UE.

FIG. 8 is a diagram 800 illustrating an example of a hardware implementation for an apparatus 802. The apparatus 802 is a UE and includes a cellular baseband processor 804 (also referred to as a modem) coupled to a cellular RF transceiver 822 and one or more subscriber identity modules (SIM) cards 820, an application processor 806 coupled to a secure digital (SD) card 808 and a screen 810, a Bluetooth module 812, a wireless local area network (WLAN) module 814, a Global Positioning System (GPS) module 816, and a power supply 818. The cellular baseband processor 804 communicates through the cellular RF transceiver 822 with the UE 84 and/or BS 82/180. The cellular baseband processor 804 may include a computer-readable medium/memory. The cellular baseband processor 804 is responsible for general processing, including the execution of software stored on the computer-readable medium/memory. The software, when executed by the cellular baseband processor 804, causes the cellular baseband processor 804 to perform the various functions described supra. The computer-readable medium/memory may also be used for storing data that is manipulated by the cellular baseband processor 804 when executing software.

The cellular baseband processor 804 further includes a reception component 830, a communication manager 832, and a transmission component 834. The communication manager 832 includes the one or more illustrated components. The components within the communication manager 832 may be stored in the computer-readable medium/memory and/or configured as hardware within the cellular baseband processor 804. The cellular baseband processor 804 may be a component of the UE 350 and may include the memory 360 and/or at least one of the TX processor 368, the RX processor 356, and the controller/processor 359. In one configuration, the apparatus 802 may be a modem chip and include just the baseband processor 804, and in another configuration, the apparatus 802 may be the entire UE (e.g., see 350 of FIG. 3) and include the aforementioned additional modules of the apparatus 802.

The communication manager 832 includes a measurement component 840, a determination component 842, a SSB alignment component 844, a measurement gap adjustment component 846, a timing offset component 848, a reporting component 850 and a connection management component 852. The apparatus may include additional components that perform each of the blocks of the algorithm in the aforementioned flowcharts of FIGS. 6 and 7. As such, each block in the aforementioned flowcharts of FIGS. 6 and 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 802, and in particular the cellular baseband processor 804, includes means for determining whether a neighbor cell associated with a first frequency is misaligned with a serving cell associated with a second frequency different than the first frequency based on first measurements of the neighbor cell within a first measurement gap window having a first length. The apparatus 802 also includes means for detecting a location of at least one synchronization signal block (SSB) associated with the neighbor cell within a second measurement gap window having a second length greater than the first length based on the determining that the neighbor cell is misaligned with the serving cell. The apparatus 802 also includes means for determining an alignment offset between the location of the at least one SSB associated with the neighbor cell and the first measurement gap window. The apparatus 802 also includes means for obtaining second measurements of the neighbor cell within a third measurement gap window that includes the location of the at least one SSB associated with the neighbor cell based on the alignment offset and one or more parameters of the at least one SSB associated with the neighbor cell.

The aforementioned means may be one or more of the aforementioned components of the apparatus 802 configured to perform the functions recited by the aforementioned means. As described supra, the apparatus 802 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

The following examples are illustrative only and may be combined with aspects of other embodiments or teachings described herein, without limitation.

Aspect 1 is a method of wireless communication performed by a user equipment that includes determining whether a neighbor cell associated with a first frequency is misaligned with a serving cell associated with a second frequency different than the first frequency based on first measurements of the neighbor cell within a first measurement gap window having a first length; detecting a location of at least one synchronization signal block (SSB) associated with the neighbor cell within a second measurement gap window having a second length greater than the first length based on the determining that the neighbor cell is misaligned with the serving cell; determining an alignment offset between the location of the at least one SSB associated with the neighbor cell and the first measurement gap window; and obtaining second measurements of the neighbor cell within a third measurement gap window that includes the location of the at least one SSB associated with the neighbor cell based on the alignment offset and one or more parameters of the at least one SSB associated with the neighbor cell.

In Aspect 2, the method of Aspect 1 further includes that the determining that the neighbor cell is misaligned with the serving cell comprises determining that the at least one SSB associated with the neighbor cell is not detected within the first measurement gap window.

In Aspect 3, the method of Aspect 1 or Aspect 2 further includes that the one or more parameters of the at least one SSB associated with the neighbor cell comprises a SSB burst periodicity, wherein the second length of the second measurement gap window is based on the SSB burst periodicity.

In Aspect 4, the method of Aspect 3 further includes that the second length of the second measurement gap window includes a duration of the SSB burst periodicity and one or more subframes.

In Aspect 5, the method of any of Aspects 1-4 further includes determining the second measurement gap window by adjusting the first measurement gap window from the first length to the second length.

In Aspect 6, the method of Aspect 5 further includes that at least a portion of the second measurement gap window overlaps in time with the first measurement gap window.

In Aspect 7, the method of any of Aspects 1-6 further includes that the second measurement gap window is non-overlapping in time with the first measurement gap window.

In Aspect 8, the method of any of Aspects 1-7 further includes camping on the serving cell; and obtaining, via the serving cell, the first measurements of the neighbor cell within the first measurement gap window, wherein the determining that the neighbor cell is misaligned with the serving cell comprises determining that the first measurement gap window is misaligned with a SSB measurement timing configuration (SMTC) window of the neighbor cell based on the first measurements.

In Aspect 9, the method of Aspect 8 further includes initiating the third measurement gap window at a time that is aligned with a system frame number (SFN) of the neighbor cell that includes the SMTC window of the neighbor cell and the location of the at least one SSB associated with the neighbor cell based on alignment offset.

In Aspect 10, the method of any of Aspects 1-9 further includes that the third measurement gap window has a third length that corresponds to the first length of the first measurement gap window.

In Aspect 11, the method of any of Aspects 1-10 further includes that the determining the alignment offset comprises calculating a first timing offset between a first time at which a reference SSB is located and a second time at which a first SSB associated with the serving cell is located; and calculating a second timing offset between the first time at which the reference SSB is located and a third time at which a second SSB associated with the neighbor cell is located, wherein the alignment offset corresponds to a difference between the first timing offset and the second timing offset.

In Aspect 12, the method of any of Aspects 1-11 further includes that the neighbor cell is asynchronous with the serving cell based on the determining that the neighbor cell is misaligned with the serving cell.

In Aspect 13, the method of any of Aspects 1-12 further includes detecting whether the location of the at least one synchronization signal block (SSB) associated with the neighbor cell is present within the first measurement gap window; and determining that the neighbor cell is not misaligned with the serving cell based on the detecting of the location of the at least one SSB associated with the neighbor cell within the first measurement gap window.

In Aspect 14, the method of Aspect 13 further includes that the neighbor cell is synchronous with the serving cell based on the determining that the neighbor cell is not misaligned with the serving cell.

In Aspect 15, the method of any of Aspects 1-14 further includes that the third measurement gap window is non-overlapping in time with the first measurement gap window and the second measurement gap window.

Example 16 is a device including one or more processors and one or more memories in electronic communication with the one or more processors storing instructions executable by the one or more processors to cause the system or apparatus to implement a method as in any of Examples 1 to 15.

Example 17 is a system or apparatus including means for implementing a method or realizing an apparatus as in any of Examples 1 to 15.

Example 18 is a non-transitory computer readable medium storing instructions executable by one or more processors to cause the one or more processors to implement a method as in any of Examples 1 to 15.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication performed by a user equipment (UE), the method comprising:

determining whether a neighbor cell associated with a first frequency is misaligned with a serving cell associated with a second frequency different than the first frequency based on first measurements of the neighbor cell within a first measurement gap window having a first length;
detecting a location of at least one synchronization signal block (SSB) associated with the neighbor cell within a second measurement gap window having a second length greater than the first length based on the determining that the neighbor cell is misaligned with the serving cell;
determining an alignment offset between the location of the at least one SSB associated with the neighbor cell and the first measurement gap window; and
obtaining second measurements of the neighbor cell within a third measurement gap window that includes the location of the at least one SSB associated with the neighbor cell based on the alignment offset and one or more parameters of the at least one SSB associated with the neighbor cell.

2. The method of claim 1, wherein the determining that the neighbor cell is misaligned with the serving cell comprises determining that the at least one SSB associated with the neighbor cell is not detected within the first measurement gap window.

3. The method of claim 1, wherein the one or more parameters of the at least one SSB associated with the neighbor cell comprises a SSB burst periodicity, wherein the second length of the second measurement gap window is based on the SSB burst periodicity.

4. The method of claim 3, wherein the second length of the second measurement gap window includes a duration of the SSB burst periodicity and one or more subframes.

5. The method of claim 1, further comprising determining the second measurement gap window by adjusting the first measurement gap window from the first length to the second length.

6. The method of claim 5, wherein at least a portion of the second measurement gap window overlaps in time with the first measurement gap window.

7. The method of claim 1, wherein the second measurement gap window is non-overlapping in time with the first measurement gap window.

8. The method of claim 1, further comprising:
camping on the serving cell; and
obtaining, via the serving cell, the first measurements of the neighbor cell within the first measurement gap window,
wherein the determining that the neighbor cell is misaligned with the serving cell comprises determining that the first measurement gap window is misaligned with a SSB measurement timing configuration (SMTC) window of the neighbor cell based on the first measurements.

9. The method of claim 8, further comprising initiating the third measurement gap window at a time that is aligned with a system frame number (SFN) of the neighbor cell that includes the SMTC window of the neighbor cell and the location of the at least one SSB associated with the neighbor cell based on alignment offset.

10. The method of claim 1, wherein the third measurement gap window has a third length that corresponds to the first length of the first measurement gap window.

11. The method of claim 1, wherein the determining the alignment offset comprises:

calculating a first timing offset between a first time at which a reference SSB is located and a second time at which a first SSB associated with the serving cell is located; and
calculating a second timing offset between the first time at which the reference SSB is located and a third time at which a second SSB associated with the neighbor cell is located,
wherein the alignment offset corresponds to a difference between the first timing offset and the second timing offset.

12. The method of claim 1, wherein the neighbor cell is asynchronous with the serving cell based on the determining that the neighbor cell is misaligned with the serving cell.

13. The method of claim 1, further comprising:
detecting whether the location of the at least one synchronization signal block (SSB) associated with the neighbor cell is present within the first measurement gap window; and
determining that the neighbor cell is not misaligned with the serving cell based on the detecting of the location of the at least one SSB associated with the neighbor cell within the first measurement gap window.

14. The method of claim 13, wherein the neighbor cell is synchronous with the serving cell based on the determining that the neighbor cell is not misaligned with the serving cell.

15. The method of claim 1, wherein the third measurement gap window is non-overlapping in time with the first measurement gap window and the second measurement gap window.

16. An apparatus for wireless communication, the apparatus comprising:
at least one processor;
a transceiver; and
a memory, coupled to the transceiver and the at least one processor, storing computer executable code, which when executed by the at least one processor, causes the at least one processor to:
determine whether a neighbor cell associated with a first frequency is misaligned with a serving cell associated with a second frequency different than the first frequency based on first measurements of the neighbor cell within a first measurement gap window having a first length;
detect a location of at least one synchronization signal block (SSB) associated with the neighbor cell within a second measurement gap window having a second length greater than the first length based on the determining that the neighbor cell is misaligned with the serving cell;
determine an alignment offset between the location of the at least one SSB associated with the neighbor cell and the first measurement gap window;
obtain second measurements of the neighbor cell within a third measurement gap window that includes the location of the at least one SSB associated with the neighbor cell based on the alignment offset and one or more parameters of the at least one SSB associated with the neighbor cell; and
transmit, to the serving cell, via the transceiver, a report comprising the second measurements.

17. The apparatus of claim 16, wherein the code, which when executed by the at least one processor, causing the apparatus to determine that the neighbor cell is misaligned with the serving cell further causes the apparatus to determine that the at least one SSB associated with the neighbor cell is not detected within the first measurement gap window.

18. The apparatus of claim 16, wherein the one or more parameters of the at least one SSB associated with the neighbor cell comprises a SSB burst periodicity, wherein the second length of the second measurement gap window is based on the SSB burst periodicity, wherein the second length of the second measurement gap window includes a duration of the SSB burst periodicity and one or more subframes.

19. The apparatus of claim 16, wherein the code, which when executed by the at least one processor, further causes the at least one processor to determine the second measurement gap window by adjusting the first measurement gap window from the first length to the second length, wherein at least a portion of the second measurement gap window overlaps in time with the first measurement gap window.

20. The apparatus of claim 16, wherein the second measurement gap window is non-overlapping in time with the first measurement gap window.

21. The apparatus of claim 16, wherein the code, which when executed by the at least one processor, further causes the at least one processor to:
camp on the serving cell; and
obtain, via the serving cell, the first measurements of the neighbor cell within the first measurement gap window,
wherein the determining that the neighbor cell is misaligned with the serving cell comprises determining that the first measurement gap window is misaligned with a SSB measurement timing configuration (SMTC) window of the neighbor cell based on the first measurements.

22. The apparatus of claim 21, wherein the code, which when executed by the at least one processor, further causes the at least one processor to initiate the third measurement gap window at a time that is aligned with a system frame number (SFN) of the neighbor cell that includes the SMTC window of the neighbor cell and the location of the at least one SSB associated with the neighbor cell based on alignment offset.

23. The apparatus of claim 16, wherein the third measurement gap window has a third length that corresponds to the first length of the first measurement gap window.

24. The apparatus of claim 16, wherein the code, which when executed by the at least one processor, causing the apparatus to determine the alignment offset further causes the apparatus to:
calculate a first timing offset between a first time at which a reference SSB is located and a second time at which a first SSB associated with the serving cell is located; and
calculate a second timing offset between the first time at which the reference SSB is located and a third time at which a second SSB associated with the neighbor cell is located,
wherein the alignment offset corresponds to a difference between the first timing offset and the second timing offset.

25. The apparatus of claim 16, wherein the neighbor cell is asynchronous with the serving cell based on the determining that the neighbor cell is misaligned with the serving cell.

26. The apparatus of claim 16, wherein the code, which when executed by the at least one processor, further causes the at least one processor to:

detect whether the location of the at least one synchronization signal block (SSB) associated with the neighbor cell is present within the first measurement gap window; and
determine that the neighbor cell is not misaligned with the serving cell based on the detecting of the location of the at least one SSB associated with the neighbor cell within the first measurement gap window.

27. The apparatus of claim 26, wherein the neighbor cell is synchronous with the serving cell based on the determining that the neighbor cell is not misaligned with the serving cell.

28. The apparatus of claim 16, wherein the third measurement gap window is non-overlapping in time with the first measurement gap window and the second measurement gap window.

29. An apparatus for wireless communication, comprising:
means for determining whether a neighbor cell associated with a first frequency is misaligned with a serving cell associated with a second frequency different than the first frequency based on first measurements of the neighbor cell within a first measurement gap window having a first length;
means for detecting a location of at least one synchronization signal block (SSB) associated with the neighbor cell within a second measurement gap window having a second length greater than the first length based on the determining that the neighbor cell is misaligned with the serving cell;
means for determining an alignment offset between the location of the at least one SSB associated with the neighbor cell and the first measurement gap window; and
means for obtaining second measurements of the neighbor cell within a third measurement gap window that includes the location of the at least one SSB associated with the neighbor cell based on the alignment offset and one or more parameters of the at least one SSB associated with the neighbor cell.

30. A non-transitory computer-readable medium storing computer executable code, which when executed by at least one processor, causes the at least one processor to:
determine whether a neighbor cell associated with a first frequency is misaligned with a serving cell associated with a second frequency different than the first frequency based on first measurements of the neighbor cell within a first measurement gap window having a first length;
detect a location of at least one synchronization signal block (SSB) associated with the neighbor cell within a second measurement gap window having a second length greater than the first length based on the determining that the neighbor cell is misaligned with the serving cell;
determine an alignment offset between the location of the at least one SSB associated with the neighbor cell and the first measurement gap window;
obtain second measurements of the neighbor cell within a third measurement gap window that includes the location of the at least one SSB associated with the neighbor cell based on the alignment offset and one or more parameters of the at least one SSB associated with the neighbor cell; and transmit, to the serving cell, a report comprising the second measurements.

\* \* \* \* \*